United States Patent Office 2,863,899
Patented Dec. 9, 1958

2,863,899
SUBSTITUTED THIOLCARBANILIC ESTERS

Guy H. Harris, Concord, Calif.

No Drawing. Application February 20, 1956
Serial No. 566,373

6 Claims. (Cl. 260—455)

This invention is concerned with thiolcarbanilic esters having the formula

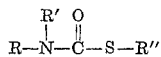

In this and succeeding formulae, R represents a haloaryl radical, R' represents a member of the group consisting of hydrogen and methyl, and R" represents an aliphatic hydrocarbon radical containing from 1 to 5 carbon atoms, inclusive, and selected from the group consisting of lower-alkyl and lower-alkenyl radicals. These new compounds are crystalline solids which are soluble in many common organic solvents, such as acetone and xylene, and of very low solubility in water and 10 percent aqueous sodium hydroxide. They are valuable as parasiticides for the control of bacterial, mite and insect organisms and as herbicides for the control of plant growth.

The new thiolcarbanilic esters may be prepared by causing a thiolchloroformic ester having the formula

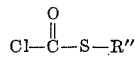

to react with an aryl amine having the formula

In the preparation, the reactants are contacted one with the other and with agitation. The reaction is usually exothermic and takes place smoothly over the temperature range of from 15° to 80° C. with the formation of the desired product and hydrogen chloride of reaction. The temperature may be controlled by regulating the rate at which the reactants are combined and by cooling or heating as necessary. The reaction is carried out in the presence of an inert solvent such as diethyl ether or n-pentane and preferably in the presence of a hydrogen chloride acceptor. Suitable hydrogen chloride acceptors include tertiary amines such as triethylamine and pyridine. Good results are obtained when substantially equimolar amounts of thiolchloroformic ester, arylamine and hydrogen chloride acceptor are employed.

In carrying out the reaction, the thiolchloroformic ester conveniently is added to a solution of the arylamine and tertiary amine in the reaction solvent. The mixture then is maintained for a period of time at a reaction temperature, during which time the tertiary amine hydrochloride precipitates from the reaction mixture as a crystalline solid. When the reaction is substantially complete as evidenced by no further separation of the hydrochloride salt, an amount of water, just sufficient to dissolve the separated salt, is added to the reaction mixture. The resulting mixture is washed with dilute mineral acid, the acid wash layer then separated from the organic layer, the latter dried, and the solvent removed therefrom by evaporation or low temperature distillation to recover the thiolcarbanilate product as a residue. The crude product may be purified by washing with an inert solvent or recrystallizing from a non-polar solvent such as hexane or benzene, or a mixture of such solvents.

These esters may be prepared by an alternative method wherein a trialkylammonium thiolcarbanilate having the formula

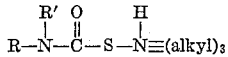

is caused to react with an aliphatic chlorine compound having the formula

Preferable trialkylammonium salts include those in which the alkyl radical is lower alkyl such as ethyl, methyl or propyl. The reaction takes place in the temperature range of 20° to 50° C. with the formation of the desired product and hydrogen chloride of reaction. The reaction is carried out in the presence of a polar solvent such as isopropanol, ethanol, or methanol as reaction medium. Good results are obtained when substantially equimolar proportions of the reactants are employed.

In carrying out the reaction, the aliphatic chlorine compound is added to a suspension of thiolcarbanilate salt and the mixture agitated for a period of time at the reaction temperature employed. As the reaction proceeds the thiolcarbanilate salt dissolves with the formation of a soluble thiolcarbanilate ester product. After the reaction is substantially complete, as evidenced by the dissolution of the reactant salt, the solvent is removed by evaporation to obtain the product as residue. The latter may be purified by dissolving in an inert solvent, such as diethyl ether, extracting amine impurity therefrom with dilute acid, followed by recovering and recrystallizing the product as previously described.

Those of the new esters having the formula

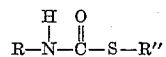

may be prepared by still another method. According to this procedure, an isocyanate having the formula

is caused to react with an alkyl or alkenyl mercaptan having the formula R"SH. The reaction takes place smoothly at temperatures of from 15° to 80° C. It is conducted in the presence of a catalytic amount of a tertiary amine such as triethylamine or pyridine and in an inert organic solvent such as ether or pentane. Good results are obtained by employing substantially equimolar proportions of the isocyanate and mercaptan, and an amount of catalyst of from 5 to 10 percent by volume of the mercaptan.

In carrying out this procedure, the isocyanate is added to a solution of mercaptan and tertiary amine in the reaction solvent, and the resulting mixture maintained for a period of time within the temperature range of from 15° to 80° C. Oftentimes the reaction takes place slowly and it is desirable to allow the mixture to stand for a period of from 10 to 60 hours at room temperature or to reflux for a short period. The thiolcarbanilate product usually crystallizes from the reaction mixture and is recovered by filtration. Cooling or the partial removal of solvent may be employed to encourage separation of the desired product. The crude product may be purified as previously described.

The choice of one of the above preparative methods for producing a particular compound is governed by various factors. Thus, the cost of the reagents employed, the commercial availability of the reactants or other factors such as the rate of reaction may govern the method to be employed.

The following examples illustrate the invention but are not to be construed as limiting.

Example 1.—Isopropyl 4-chloro-N-methyl-thiolcarbanilate

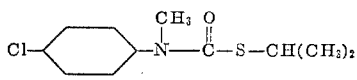

To a solution of 35.6 grams (0.25 mole) of N-methyl-4-chloroaniline and 35 milliliters (0.25 mole) of triethylamine in 150 milliliters of ether was added with stirring to 34.6 milliliters (0.25 mole) of isopropyl thiolchloroformate. The addition was carried out portionwise at room temperature with solid triethylamine hydrochloride separating from the reaction mixture. After completion of the reaction as evidenced by no further formation of the hydrochloride salt, a small amount of water was added to dissolve the salt, and the wet ethereal solution washed with dilute acid. The water immiscible layer was separated, dried over sodium sulfate and the ether removed by evaporation. The isopropyl 4-chloro-N-methylthiolcarbanilate product recovered as a solid residue, was purified by dissolving in pentane and then precipitating by chilling. The purified crystalline product melted at 86.0°–86.5° C. and had a nitrogen content of 5.74 percent and a sulfur content of 13.19 percent. The theoretical values for the elements are 5.74 percent nitrogen and 13.16 percent sulfur.

Example 2.—Isopropyl 3,4-dichlorothiolcarbanilate

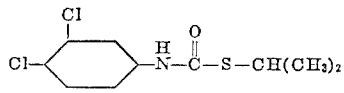

A solution of 34 grams (0.18 mole) of 3,4-dichlorophenylisocyanate in approximately 200 milliliters of 1:3 etherpentane was added slowly with stirring to a solution of 20 milliliters (0.21 mole) of isopropyl mercaptan and 2 milliliters of triethylamine in 250 milliliters of pentane. The reaction began immediately and was mildly exothermic so that it was necessary to conduct the addition under reflux to avoid vapor loss. Stirring was continued for about one hour after completion of the addition. The reaction mixture was then poured into an evaporating dish and evaporated to dryness at ambient temperature. The solid residue was recrystallized from hot benzene to give 43.8 grams of an isopropyl 3,4-dichloro-thiolcarbanilate product melting at 94.5°–95° C. This represented a yield of 91.6 percent of theoretical. The crystalline compound has a chlorine content of 27.0 percent; the theoretical value is 26.8 percent.

Example 3.—Isopropyl 3-chloro-4-methylthiolcarbanilate

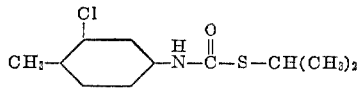

A pentane solution containing 92 grams (0.56 mole) of 3-chloro-4-methylphenylisocyanate was added slowly with stirring to a solution of 67 milliliters of isopropyl mercaptan (0.70 mole) and 5 milliliters of triethylamine in one liter of pentane. The reaction began immediately and was mildly exothermic. One hour after completion of the addition, the precipitated isopropyl 3-chloro-4-methylthiolcarbanilate product was filtered from the reaction mixture and washed with pentane. The crystalline solid melted at 88.8°–89° C. and had a chlorine content of 14.44 percent and a sulfur content of 12.90 percent. The theoretical values for the elements are 15.43 percent nitrogen and 13.15 percent sulfur. It was obtained in a yield of 121 grams or 78 percent of the theoretical amount.

Example 4.—Methyl 3-chlorothiolcarbanilate

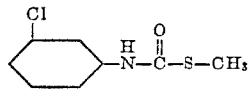

100 grams (0.65 mole) of 3-chlorophenyl isocyanate was added slowly with stirring to a solution containing mercaptan and catalyst which had been prepared by adding 54 milliliters (0.73 mole) of methyl mercaptan and 5 milliliters of triethylamine in one liter of pentane. The reaction initiated immediately with considerable evolution of heat. After completion of the addition, the reaction mixture was allowed to stand at room temperature for about 16 hours. At the end of this period the mixture was filtered to separate a precipitated crystalline methyl 3-chlorothiolcarbanilate product. The latter was purified by washing with n-pentane and drying to obtain a product melting from 91.3° to 91.8° C. in a yield of 124.9 grams or 92 percent of theoretical. The product had a chlorine content of 18.0 percent and a nitrogen content of 7.0 percent. The theoretical values are 17.6 percent chlorine and 6.95 percent nitrogen.

Example 5.—Secondary butyl 4-chlorothiolcarbanilate

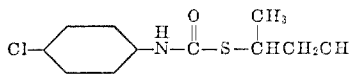

A solution of 55.0 grams (0.36 mole) of 4-chlorophenyl isocyanate in 200 milliliters of pentane was added slowly to a pentane solution of 32.7 grams (0.36 mole) of secondary butyl mercaptan and 3 milliliters of triethylamine over a period of about ten minutes. Some reaction occurred immediately with moderate evolution of heat. The mixture was allowed to stand overnight and then heated at reflux temperature for a few minutes to insure completion of the reaction. A white crystalline secondary butyl 4-chlorothiolcarbanilate product precipitated on cooling. The latter was separated from the reaction mixture by filtration, washed with cold pentane and dried. The purified product was found to melt at 65°–66° C., have a nitrogen content of 5.68 percent, and a chlorine content of 14.5 percent. The theoretical value of the elements are 5.75 percent nitrogen and 14.55 percent chlorine. The yield of 76.7 grams was 88 percent of the theoretical.

Example 6.—Isopropyl 4-chlorothiolcarbanilate

A reaction was carried out in the manner described in Example 5 and in which 27.4 grams (0.36 mole) of isopropyl mercaptan was substituted for the secondary butyl mercaptan. The reaction mixture was allowed to stand overnight and the precipitated crystalline solid recovered and purified as previously described to obtain a crystalline isopropyl 4-chlorothiolcarbanilate product melting at 102.7°–103.3° C., and having a nitrogen content of 6.1 percent and a chlorine content of 15.5 percent. The theoretical value for the elements are 6.11 percent nitrogen and 15.46 percent chlorine.

Example 7.—Isopropyl 3-chlorothiolcarbanilate 92.1 grams (0.60 mole) of 3-chlorophenyl isocyanate was added portionwise at room temperature to a stirred solution of 60 milliliters (0.63 mole) of isopropyl mercaptan and 9 milliliters of triethylamine in one liter of n-pentane. During the course of the reaction, an oil separated in the reaction mixture. After completion of the reaction, the mixture was subjected to intense cooling whereupon the oil crystallized. The crystalline material was separated by filtration, washed with pentane and air-dried to obtain an isopropyl 3-chlorothiolcarbanilate product. The latter melted at 66.2°–67° C., and had a nitrogen content of 6.10 percent and a chlorine content of 15.54 percent. The theoretical value for the elements are 6.11 percent nitrogen and 15.46 percent chlorine. The total amount of the product was 122.7 grams representing a yield of 89.3 percent of theoretical.

Example 8.—Allyl 4-chlorothiolcarbanilate 30 grams (0.10 mole) of triethylammonium 4-chlorothiolcarbanilate was suspended in a mixture of 125 milliliters of isopropanol and 30 milliliters of methanol. 8.4 milliliters (0.10 mole) of allyl chloride was added in one portion to the above suspension and the resulting mixture stirred for several hours at room temperature. During the course of the stirring, the solid triethylammonium salt gradually dissolved and reacted with the formation of a yellow solution. After several hours, a small amount of the ammonium salt which had not reacted was removed by filtration and the filtrate evaporated at room temperature to obtain an allyl 4-chlorothiolcarbanilate product as residue. The latter was dissolved in diethyl ether and the resulting solution washed with dilute aqueous hydrochloric acid. The solvent was removed from the washed ether solution by evaporation and the residue recrystallized from hot hexane to obtain a purified product melting at 78.6°–79° C. The crystalline solid had a nitrogen content of 15.7 percent. The theoretical value is 15.6 percent.

*Example 9*

In similar preparations, the following thiolcarbanilic esters were obtained:

An isopropyl 2,5-dichlorothiolcarbanilate product, melting at 88°–88.5° C., by the reaction of 2,5-dichlorophenyl isocyanate and isopropyl mercaptan.

An isopropyl 2-chlorothiolcarbanilate product melting at 54.2°–54.8° C., by the reaction of 2-chlorophenyl isocyanate and isopropyl mercaptan.

A methyl 3-chlorothiolcarbanilate product melting at 91.3°–91.8° C., by the reaction of 3-chlorophenyl isocyanate and methyl mercaptan.

A methyl 4-chlorothiolcarbanilate product, melting at 130.5°–131.5° C., by the reaction of 4-chlorophenyl isocyanate and methyl mercaptan.

An isoamyl 4-chlorothiolcarbanilate product, melting at 79.5°–80° C., by the reaction of 4-chlorophenyl isocyanate and isoamyl mercaptan.

*Example 10.—Secondary butyl 4-bromothiolcarbanilate*

A solution containing 71.3 grams (0.36 mole) of 4-bromophenyl isocyanate in 200 milliliters of pentane is added slowly to a solution containing 32.7 grams (0.36 mole) of secondary butyl mercaptan and 3 milliliters of triethylamine and the reaction mixture allowed to stand overnight. The crude solid product resulting from these operations is separated from the mixture by filtration and recrystallized from hexane to give a solid secondary butyl 4-bromothiolcarbanilate product having a molecular weight of 287.9.

*Example 11.—Isobutenyl 4-chlorothiolcarbanilate*

100 grams (0.65 mole) of 4-chlorophenyl isocyanate is added slowly with stirring to a solution of 57.1 grams (0.65 mole) of isobutenyl mercaptan and 5 milliliters of triethylamine in one liter of pentane. Reaction is initiated at room temperature during the addition. The stirring is continued for several hours and thereafter the mixture is allowed to stand for several days at room temperature. A solid precipitates from the mixture. The latter is separated by filtration and recrystallized from benzene-hexane mixture to give a white, crystalline, isobutenyl 4-chlorothiolcarbanilate product having a molecular weight of 227.5.

*Example 12*

60 grams (0.20 mole) of triethylammonium 4-chlorothiolcarbanilate is suspended in a mixture of 200 milliliters of isopropanol and 50 milliliters of methanol. 7.8 grams (0.20 mole) of normal propyl chloride is added in one portion to the above suspension and the resulting mixture is stirred for several hours at room temperature. During the course of the reaction, the solid triethylammonium salt gradually dissolves with the formation of a clear solution. The solvent is removed from the resulting solution by evaporation and the residue is dissolved in diethyl ether. The ether solution is washed with dilute aqueous hydrochloric acid and the solvent removed from the ether solution by vaporization to give a normal propyl 4-chlorothiolcarbanilate product having a molecular weight of 229.62.

The products of the preceding examples are effective as parasiticides and herbicides and are adapted to be employed for the control of agricultural pests and undesired vegetation. In a representative operation, isopropyl 4-chlorothiolcarbanilate was employed for the control of plant-infesting mites, *Tetranychus bimaculatus* and *Tetranychus atlanticus*. In such operations, 100 percent controls of the indicated organisms were obtained when plants were sprayed with aqueous compositions containing as active toxic ingredients, 0.05 gram of 4-chlorothiolcarbanilate per 100 milliliters of ultimate mixture.

The isocyanates to be employed as starting materials as previously described may be prepared by several known methods. In a convenient method, the compounds are prepared by the reaction of phosgene on a suitable substituted aniline. In such method an ethereal solution of the substituted aniline is slowly added at room temperature to an ethereal solution of ethyl acetate saturated with phosgene. Following the reaction, the desired product is removed by filtration and recrystallized from an appropriate solvent, such as carbon tetrachloride.

The trialkylammonium thiolcarbanilate salts may be prepared conveniently by passing carbon oxysulfide into a solution of a trialkylamine and a suitable arylamine in an organic solvent such as diisopropyl ether or n-pentane while heating at reflux temperature. During the reaction the desired product separates and solidifies in the reaction mixture as a crystalline solid. The latter may be separated and, if desired, purified by conventional methods.

I claim:

1. A thiolcarbanilic ester having the formula $$\begin{array}{c} R' \ O \\ | \ \| \\ R-N-C-S-R'' \end{array}$$

wherein R represents a haloaryl radical of the benzene series, R' represents a member of the group consisting of hydrogen and methyl, and R'' represents a member of the group consisting of the lower-alkyl and lower-alkenyl radicals.

2. Isopropyl 3,4-dichlorothiolcarbanilate.
3. Isopropyl 3-chloro-4-methylthiolcarbanilate.
4. Isopropyl 4-chlorothiolcarbanilate.
5. Isopropyl 4-chloro-N-methylthiolcarbanilate.
6. Allyl 4-chlorothiolcarbanilate.

References Cited in the file of this patent

UNITED STATES PATENTS

| | | |
|---|---|---|
| 2,259,869 | Allen | Oct. 21, 1941 |
| 2,325,720 | Urbschat | Aug. 3, 1943 |
| 2,553,775 | Hawley et al. | May 22, 1951 |
| 2,723,989 | Harman | Nov. 15, 1955 |
| 2,764,592 | Seeger et al. | Sept. 25, 1956 |

FOREIGN PATENTS

| | | |
|---|---|---|
| 478,573 | Italy | Feb. 25, 1953 |
| 701,712 | Great Britain | Dec. 30, 1953 |

OTHER REFERENCES

Journal of American Chemical Soc., article by Mull, vol. 77, pp. 581–583.

Riemschneider et al.: Monatsh. 84, 518–21 (1953).